Dec. 27, 1966  F. ARMBRUSTER  3,294,271

PLASTIC BARREL

Filed July 5, 1962

INVENTOR
Fritz Armbruster

BY
Michael J. Striker
ATTORNEY

3,294,271
PLASTIC BARREL
Fritz Armbruster, Korntalerstrasse 23,
Stuttgart-Stammheim, Germany
Filed July 5, 1962, Ser. No. 207,513
6 Claims. (Cl. 220—5)

The present invention relates to barrels in general, and more particularly to a barrel which consists of plastic material and which is especially suited for storage and/or transportion of beer and similar beverages. The invention also relates to a method of and to an apparatus for making plastic barrels.

As is known, barrels for storage of beer and similar beverages are normally made of wood or light metal. Such barrels are rather costly and, therefore, attempts were made to manufacture beer barrels of plastic material. However, it has been found that many plastic substances cannot match the characteristics of wood because wood is a poor conductor of heat and because the volume of a wooden barrel changes very little in response to changes in temperature of the atmospheric air. These are characteristics which are highly desirable in a beer barrel because beer is stored at certain pressure and this pressure should be maintained since any changes in pressure, particularly when combined with changes in temperature, might affect the taste and/or the color of the brew. A plastic barrel is likely to expand to such an extent that its volume increases beyond the volume of the stored liquid, especially since known plastic barrels of which I am aware at this time are formed with thin walls to reduce the weight and the manufacturing cost thereof. Consequently, such plastic barrels are not satisfactory for storage of beer, especially if the temperature of surrounding air is likely to fluctuate within a wide range.

Accordingly, it is an important object of the present invention to provide a plastic barrel which, even though its material may expand to a great extent in response to rises in temperature, is constructed and configurated in such a way that the volume of its internal space need not increase when the plastic material expands.

Another object of the invention is to provide a plastic barrel which is constructed in such a way that the volume of its internal space is actually reduced when the temperature of the surrounding air rises.

A further object of the invention is to provide a lightweight barrel of the above outlined characteristics which constitutes a highly advantageous substitute for conventional wooden, metallic or plastic beer barrels.

An additional object of my invention is to provide a novel mold for the manufacture of plastic beer barrels.

Still another object of the invention is to provide a novel method of manufacturing armored or unarmored beer barrels of plastic material.

A concomitant object of the instant invention is to provide a method according to which a plastic barrel is formed and armored in a single operation.

With the above objects in view, the invention resides in the provision of a barrel which, in its simplest form, comprises a hollow main section of plastic material and a pair of end sections which are integral with and seal the ends of the main section. In accordance with my invention, at least one end section assumes a concavo-convex shape and its convex side faces the interior of the main section. Consequently, when the barrel is heated, the concavo-convex end section or sections expand in a direction toward the interior of the barrel and tend to reduce the volume of the internal space in the main section at least to an extent corresponding to increase in the volume of the internal space in response to expansion of the main section. In other words, if the main section expands, the end section or sections also expand so that the volume of the internal space of the barrel remains unchanged or is actually reduced when the temperature of the surrounding atmospheric air rises.

In accordance with an important feature of my invention, one, two or all three sections of the barrel may be reinforced by metallic and/or plastic reinforcing elements whose expansion in response to heating is less than the expansion of the respective sections so that the expansion of the main section is reduced and that the expansion of one or both end sections is permitted only or mainly in such directions which enable the end sections to reduce the volume of the internal space in the barrel.

In accordance with my method, a barrel of the above outlined characteristics may be manufactured in the cavity of a composite mold by the so-called blow-molding process, and one or more prefabricated reinforcing elements are inserted into suitable recesses of the mold before the molding operation begins so that the reinforcing elements may be bonded to the respective sections simultaneously with the formation of such sections.

The novel features which are considered as characteristic of the invention are set forth in particular in the appended claims. The invention itself, however, both as to its construction and its method of operation, together with additional objects and advantages thereof, will be best understood from the following detailed description of certain specific embodiments with reference to the accompanying drawings, in which:

Figure 1:
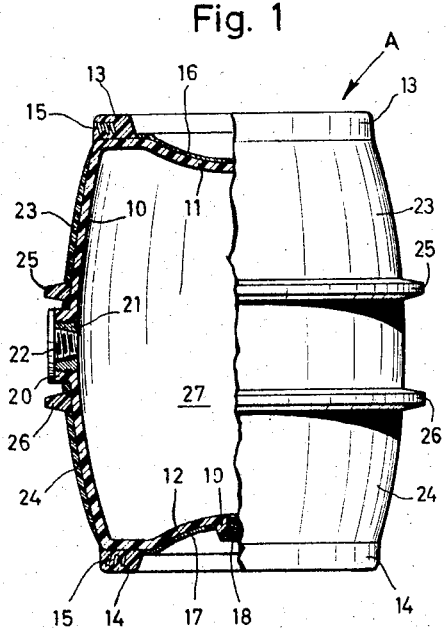
FIG. 1 is a partly elevational and partly sectional view of a barrel which embodies one form of my invention.

Referring now in greater detail to the illustrated embodiments, and first to FIG. 1, there is shown a barrel or cask A which comprises a hollow main section or mantle 10 consisting of plastic material and having an open upper end and an open lower end. These ends of the main section 10 are respectively integral with and are sealed by thin-walled concavo-convex end sections 11, 12 whose convex inner sides face the interior of the main section. The end sections 11, 12 are respectively provided with external reinforcing elements in the form of annuli 13, 14 which are bonded, welded or otherwise secured to the end sections in the regions of the respective ends of the main section 10. The reinforcing elements 13, 14 consist of plastic material which is reinforced by fibres of glass wool, and a series of metallic annuli 15 of strip stock is embedded in the material of each reinforcing element. The arrangement is such that the reinforcing elements 13, 14 expand less than the material of the sections 10-12 when the temperature of the barrel rises whereby the inwardly bent central zones of the end sections 11, 12 are automatically compelled to expand toward the interior and to thereby reduce the volume of the space 27 in the main section 10. Consequently, even if the temperature of the surrounding atmospheric air rises, the capacity of the barrel need not increase but is often reduced so that this barrel is especially suited for storage of beer and of similar beverages. As is known, beer stored in a barrel is maintained under a certain pressure which should not drop because such reduction in pressure, coupled with a rise in temperature, brings about highly undesirable changes in the taste and in the color of beer. Therefore, it was impractical to store beer in conventional plastic barrels of which I am aware at this time because the material of such conventional barrels expands more than the stored liquid when the temperature of the barrel rises whereby the pressure to which the liquid contents are subjected drops and permits irreversible separation of carbon dioxide which is absorbed in the liquid brew. By devising a plastic barrel or cask whose volume remains unchanged or is even reduced when the temperature of the surrounding air increases, I provide an ideal receptacle for beer and similar beverages which, among many other uses, is especially suited for storage and transportation of beer in regions whose climate is such that the temperature of air is likely to vary within a wide range.

Referring again to FIG. 1, it will be noted that the central zone of the upper end section 11 is reinforced by a disk-shaped metallic plate 16 which is bonded to this section and which is surrounded by the annular reinforcing element 13. A similar reinforcing plate 17 is externally adjacent to the central zone of the lower end section 12 which latter is provided with a bunghole 18. The internally threaded bush 19 of the end section 12 which surrounds the bunghole 18 may receive a bung to seal the contents of the barrel A from the atmosphere. The substantially plate-like reinforcing element 17 is provided with an aperture through which the bush 19 extends. The element 17 consists of metal, but it is equally possible to form this element and the element 16 of suitable plastic material which is reinforced by glass wool or the like.

The larger-diameter central portion of the main section 10 is provided with an internally threaded outwardly extending outlet 20 which receives a threaded sleeve 21. This sleeve defines a tap hole and is sealed by a bung 22. The main section 10 is reinforced by annular elements 23, 24 which assume the form of tubular bodies and which taper in directions toward the respective ends of the main section 10. In addition, the main section is surrounded by two spaced ring-shaped reinforcing elements or hoops 25, 26 whose diameters are greater than the maximum diameters of the reinforcing elements 23, 24 so that the hoops 25, 26 may protect the bung 22 and enable a person to roll the barrel along the ground or along another supporting structure. It is assumed that the reinforcing elements 23–26 consist of suitable synthetic plastic material whose expansion in response to heating is less than the expansion of the main section 10 to make sure that the expansion of the main section is reduced to a minimum which, added to inward expansion of the end sections 11, 12, insures that the volume of the barrel does not increase when the temperature of the surrounding air rises.

The reinforcing elements 13, 14, 16, 17 and 23–26 together constitute a reinforcing armor which is externally secured to the sections 10–12 and whose expansion in response to heating is less than the expansion of the sections. The elements 13, 14 constitute supporting legs and permit stacking of two or more barrels A above each other.

Figure 2:
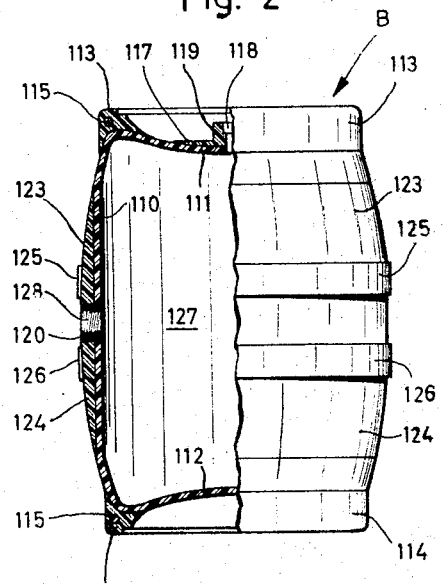
FIG. 2 is a similar partly elevational and partly sectional view of a modified barrel.

FIG. 2 illustrates a modified barrel B which comprises a slightly different main section or mantle 110, two end sections 111, 112, two annular reinforcing elements 113, 114 which are respectively secured to the outer sides of the sections 111, 112 and which consist of plastic material reinforced by annular wires or cables 115, two annular reinforcing elements 123, 124 which surround the main section 110 and whose thickness increases in a direction toward the central portion of this section, and a pair of hoops 125, 126 which respectively surround the reinforcing elements 123, 124. A further reinforcing element in the form of an apertured plate 117 is secured to the outer side of the end section 111, and this plate comprises a bush 119 which surrounds the tap hole 118. The sections 110–112 consist of plastic material, and it will be noted that the walls of these sections are rather thin. The reinforcing elements 113, 114, 123–126 and 117 consist of synthetic plastic material which is reinforced with glass wool, and the elements 113, 114 are additionally reinforced by the aforementioned metallic annuli 115 to make sure that the expansion of these elements in response to rise in the temperature of the surrounding air is less than the expansion of the material of the sections 110–112. Consequently, the end sections 111, 112 are compelled to expand inwardly toward the internal space 127 of the barrel and reduce the volume of this space to compensate for any expansion of the main section 110. This main section is provided with an outlet 120 which defines a tap hole 128 and which is internally threaded to take a bung, not shown. The outlet 120 is protected by the adjacent portions of the reinforcing elements 123, 124 and by the hoops 125, 126. The barrel B is also suited for storage of beer or of similar liquids which are maintained under a certain pressure and which are likely to change their taste and/or coloration if the pressure drops.

Figure 3:
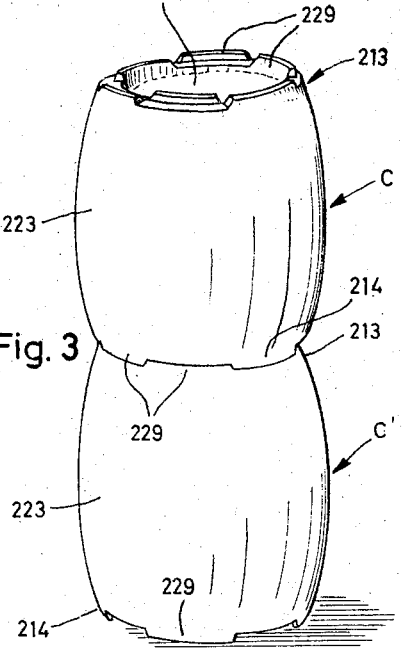
FIG. 3 is a perspective view of a pair of stacked barrels which constitute slight modifications of the barrels shown in FIGS. 1 and 2.

FIG. 3 illustrates a pair of different barrels C, C' whose end sections (only the upper end section 211 of the barrel C being shown) are reinforced by annular elements 213, 214 each of which is provided with circumferentially distributed arcuate projections 229. The projections 229 of a reinforcing element 213 extend in a direction away from the other reinforcing element 214, and it will be noted that the projections are alternately staggered with respect to each other in the radial directions of the respective reinforcing elements so that they may prevent angular displacements of the barrel C with respect to the barrel C' or vice versa. The main sections of the barrels C, C' are provided with reinforcing elements 223 which extend all the way between the respective elements 213, 214 so that they form comparatively thin protective armors about the main sections. Such armors may consist of steel or another metallic material.

Figure 4:
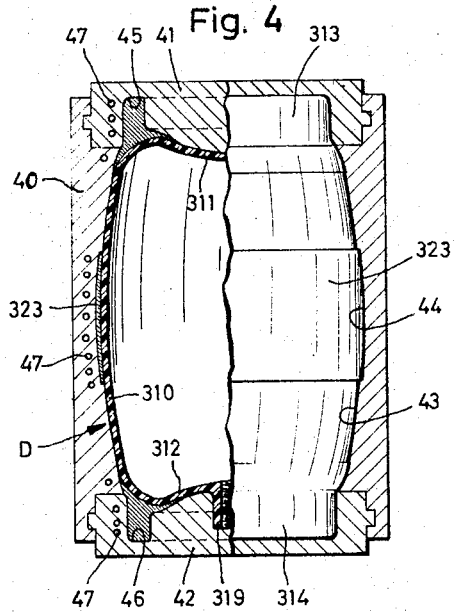
FIG. 4 is an axial section through a mold which is utilized for the manufacture of barrels somewhat different from those shown in FIGS. 1 to 3.

Referring finally to FIG. 4, there is shown a composite mold for the production of plastic barrels by the blow-molding process. This mold comprises a hollow main component or mantle 40 whose ends are connected with two head components 41, 42 to define a mold cavity 43. The head components 41, 42 are formed with convex inner sides which face each other, and the configuration of the walls bounding the mold cavity 43 resembles the outlines of a finished plastic barrel. The central portion of the main component 40 is provided with an internal annular recess 44 which accommodates a prefabricated reinforcing element 323, the latter surrounding the main section or mantle 310 of a barrel or cask D which is being formed in the mold. The reinforcing element 323 consists of metal whose expansion in response to heating is less than the expansion of the main section 310.

The head components 41, 42 are respectively provided with internal annular recesses 45, 46 which accommodate prefabricated annular reinforcing elements 313, 314 for the end sections 311, 312 of the barrel D. The reinforcing elements 313, 314 consist of metal whose expansion is less than the expansion of the end sections 311, 312 when the barrel D is heated. It will be noted that the lower reinforcing element 314 comprises a collar-like central portion which surrounds a bush 319 forming part of the lower end section 313. This bush defines a bunghole which may receive an externally threaded bung, not shown.

The components 40–42 of the composite mold are provided with means 47 for heating the mold and for simultaneously heating the prefabricated reinforcing elements 313, 314, 323 so that these elements are bonded or welded to the respective sections of the barrel D at the same time when a plasticized substance is introduced into the mold cavity 43 and is thereupon caused to assume the form of the barrel D in accordance with the well-known blow-molding method. The heating means 47 preferably consists of resistance coils which are connected to a source of electrical energy when the composite mold of FIG. 4 is in actual use. Of course, if the mold is used for the manufacture of different barrels, e.g., barrels of the type shown in FIG. 1 or 2, the components of the mold are provided with additional recesses to accommodate additional reinforcing elements, such as the hoops 25, 26 or 125, 126, etc. The heating means 47 plasticizes the material of the reinforcing elements and causes such elements to form strong permanent bonds with the sections 310-312.

The sections of my improved barrel preferably consist of low-pressure polyethylene, of butadiene-styrene resins, of resins on butadiene-styrene basis, and other suitable synthetic plastic substances. Insofar as they are made of plastic material, the reinforcing elements may consist of butadiene-styrene resins or the like.

By proper selection of the material and of the wall thickness of the reinforcing elements, the expansion of the barrel sections may be controlled with utmost accuracy to regulate any changes in volume of the internal space of the barrel.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. An integral barrel comprising a tubular main section and first and second end sections closing said tubular main section at opposite ends thereof and integral therewith, all said sections consisting of a heat expansive synthetic resin material tending to expand in respond to heating and at least one of said end sections being of concave-convex shape and having a convex inner side facing the interior of said main section; at least one annular reinforcing element secured to and surrounding said main section, said reinforcing element consisting of a material whose expansion in response to heating is less than the expansion of the material of said main section; and an additional annular reinforcing element externally adjacent to and secured to said one end section in the region of the corresponding end of said main section, said additional reinforcing element comprising at least one ring consisting of a metallic material whose expansion in response to heating is substantially less than the expansion of the material of said one end section, and a plate-shaped reinforcing element secured externally to the concave outer side of said one end section, said plate shaped reinforcing element consisting of a material whose expansion in response to heating is substantially less than the expansion of the material of said one end section, said main section being prevented by said one annular reinforcing element to expand in radial direction and said one end section being prevented by said additional reinforcing element to expand in radial direction and prevented by its shape and said plate shaped reinforcing element from expanding outwardly whereby said one end section is compelled to expand into the interior of said main section and to reduce the volume of the internal space in said barrel when the barrel is heated.

2. An integral barrel comprising a tubular main section and first and second end sections closing said tubular main section at opposite ends thereof and integral therewith, all said sections consisting of a heat expansive synthetic resin material tending to expand in response to heating and each of said end sections being of concave-convex shape and having a convex inner side facing the interior of said main section; and an annular reinforcing element for each of said end sections, each of said reinforcing elements comprising at least one metallic ring externally adjacent to and secured to said end sections in the region of the respective ends of said main section and the material of said rings being such that their expansion in response to heating is substantially less than the expansion of the heat expansive synthetic resin material of said sections whereby said end sections are prevented by said metallic rings to expand in radial direction and prevented by their own shape to expand outwardly and are therefore compelled to expand into the interior of said main section and to reduce the volume of the internal space in said barrel when the barrel is heated.

3. A barrel as set forth in claim 2, wherein at least one of said reinforcing elements comprises circumferentially distributed projections extending in a direction away from the other reinforcing element.

4. A barrel as set forth in claim 3, wherein said projections are alternately staggered with respect to each other in the radial direction of said one reinforcing element.

5. An integral barrel comprising a tubular main section and first and second end sections closing said tubular main section at opposite ends thereof and integral therewith, all said sections consisting of a heat expansive synthetic resin material tending to expand in response to heating and each of said end sections being of concave-convex shape and having a convex inner side facing the interior of said main section; and an annular reinforcing element for each of said end sections, said reinforcing elements externally adjacent to and secured to said end sections in the region of the respective ends of said main section, each of said reinforcing elements comprising at least one metallic ring and a body of plastic material surrounding the respective ring, at least the material of said rings being such that their expansion in response to heating is less than the expansion of the material of said end sections whereby said end sections are prevented by said metallic rings to expand in radial direction and prevented by their own shape to expand outwardly and are therefore compelled to expand into the interior of said main section and to reduce the volume of the internal space in said barrel when the barrel is heated.

6. An integral barrel comprising a tubular main section and first and second end sections closing said tubular main section at opposite ends thereof and integral therewith, all said sections consisting of a heat expansive synthetic resin material tending to expand in response to heating and at least one of said end sections being of concave-convex shape and having a convex inner side facing the interior of said main section; and an annular reinforcing element extending along and secured to that end of said tubular main section which is closed by said end section of concave-convex shape, said annular reinforcing element comprising at least one ring of a metallic material whose expansion in response to heating is substantially less than the expansion of said heat expansive synthetic resin material whereby said one end section is prevented by said reinforcing element to expand in radial direction and prevented by its shape to expand outwardly and is therefore compelled to expand into the interior of said main section and to reduce the volume of the internal space in said barrel when the barrel is heated.

References Cited by the Examiner

UNITED STATES PATENTS

| 1,303,532 | 5/1919 | Avery. | |
| 2,124,565 | 7/1938 | Goll. | |
| 2,146,925 | 2/1939 | Ahrbecker. | |
| 2,460,820 | 2/1949 | Hagopian. | |
| 2,751,109 | 6/1956 | Moore. | |
| 2,810,160 | 10/1957 | Bottleman | 18—42 |
| 2,983,403 | 5/1961 | Mauser | 220—71 |
| 3,008,191 | 11/1961 | Park | 18—55 |
| 3,010,602 | 11/1961 | Randolph | 220—83 |
| 3,020,595 | 2/1962 | Szajna | 18—42 |
| 3,032,823 | 5/1962 | Sherman | 18—55 |
| 3,079,038 | 2/1963 | Rossi | 220—83 |

THERON E. CONDON, *Primary Examiner.*

EARLE J. DRUMMOND, GEORGE E. LOWRANCE, LOUIS G. MANCENE, *Examiners.*